United States Patent [19]
Ziegler

[11] 4,000,619
[45] Jan. 4, 1977

[54] MEANS AND METHOD FOR CONTROLLING BEACH AND SANDBAR EROSION

[76] Inventor: Charles T. Ziegler, 9842 13th St., Santa Ana, Calif. 92703

[22] Filed: Mar. 19, 1976

[21] Appl. No.: 668,619

[52] U.S. Cl. ................................................ 61/3
[51] Int. Cl.² ......................................... E02B 3/04
[58] Field of Search ............... 61/2, 3, 4, 5, 37, 38, 61/1 R

[56] References Cited
UNITED STATES PATENTS

| 3,564,853 | 2/1971 | Csiszar | 61/5 |
| 3,928,701 | 12/1975 | Roemner | 61/4 |
| 3,928,978 | 12/1975 | Larsen | 61/3 |

Primary Examiner—Paul R. Gilliam
Assistant Examiner—Alex Grosz
Attorney, Agent, or Firm—Lyon & Lyon

[57] ABSTRACT

A means and method utilizing porous collector bags open at their upper ends and secured successively along a feeder line, one end of the feeder line being anchored in a wave area, and the other end extending onto a shore area; the collector bags being urged progressively by wave action toward the anchored end of the feeder line and caused to fill with sand to the extent that the bags settle on the bottom of the wave area in overlapping relation causing the formation of an erosion preventing groin-like deposit; thereby increasing the area and height of the bagged sand deposit. The feeder line and bags at the shore end may be wrapped as a drum from which the feeder line and bags are drawn into the wave area.

6 Claims, 8 Drawing Figures

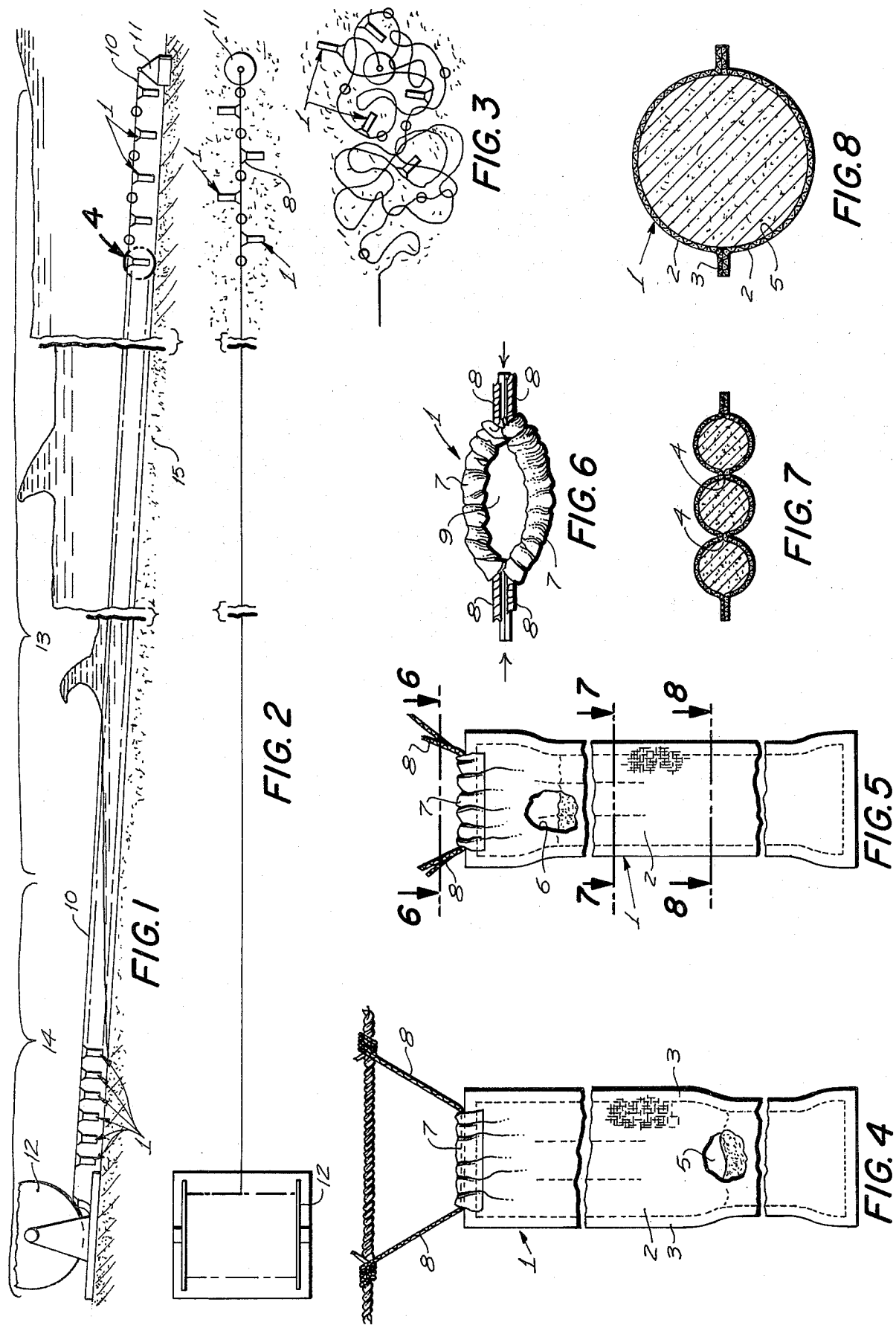

MEANS AND METHOD FOR CONTROLLING BEACH AND SANDBAR EROSION

BACKGROUND

The erosion of beaches and sand bars confronting the oceans, lakes or rivers has existed millions of years and has been a problem to man wherever attempts have been made to prevent or control erosion. As a result elaborate erosion means have been attempted at great cost and frequent failure. In this regard reference is made to a book entitled: LAND AGAINST THE SEA, published by the U.S. ARMY COASTAL ENGINEERING RESEARCH CENTER; DEPARTMENT OF THE ARMY CORPS OF ENGINEERS, identified as MISCELLANEOUS PAPER No. 4–64, May 1964.

SUMMARY

The present invention is directed to a means and method for controlling sandbar erosion and is summarized in the following objects:

First, to provide a means and method wherein, a series of porous bags are caused by wave action to fill with sand and collect on the bottom underlying the wave action with the result that the sand is immobilized and a region is established against which additional sand is collected to form a groin-like deposit.

Second, to provide a means and method for controlling sandbar erosion, wherein the porous bags are open at one end sufficiently to receive sand and are tied at close intervals to a feeder line, one end of which is anchored in the wave area and the other end of which extends to the shore area.

Third, to provide a means and method as indicated in the previous objects, wherein the wave action is utilized to draw the bags progressively from the shore area into the wave area and effect a build-up of the deposited bags.

Fourth, to provide a means and method as indicated in the other objects, wherein by placement of a plurality of multiple bag and feeder line units, effective erosion control over a wide area may be accomplished.

DESCRIPTION OF THE FIGURES

FIG. 1 is a diagrammatical sectional view showing a wave area and a shore area with the means for controlling sandbar erosion shown in place.

FIG. 2 is a diagrammatical plan view thereof.

FIG. 3 is a diagrammatical view showing accumulated set of bags and their feeder line.

FIG. 4 is a side view showing one of the collecting bags as it appears when secured to a feeder line and showing the collector bag during an early stage in the sand filling process.

FIG. 5 is a similar view showing the collecting bag almost fully filled with sand.

FIG. 6 is an enlarged end view taken from 6—6 of FIG. 5.

FIG. 7 is a transverse sectional view taken through 7—7 of FIG. 5.

FIG. 8 is a transverse sectional view taken through 8—8 of FIG. 5.

DETAILED DESCRIPTION

The means and method for controlling sandbar erosion utilizes a series of sand collecting bags 1. In preliminary tests, porous cloth bags an inch and one-half wide and eight inches long were used. However, it should be noted that bags of different sizes may be used depending upon the many factors such as the size and area in which erosion occurs, the wave action and the location in which wave action occurs whether it be from the ocean inlets, bays, lakes or rivers.

Each sand collecting bag may be formed of two porous wall members 2 joined together by border stitching 3 and they may further include longitudinally extending divider stitching 4 so as to form at the bottom of the bag a main bag chamber 5 and the top divided portion of the bag chambers 6.

Each of the two wall members 2 have folded and pleated ends 7 to receive a tie string 8 and may be gathered to form an entrance opening 9 of similar dimension than the cross-section of the bag 1.

In preliminary tests with the bag construction essentially as shown, the bag, when exposed to ocean waves filled in approximately fifteen to thirty minutes.

The sand collecting bags 1 are joined to a feeder line 10 by means of the tie strings 8, the tie strings are preferably diverging from the bag as shown in FIG. 4. The bags may be closely spaced on the feeder line as indicated diagrammatically in FIGS. 1 and 2.

One end of the feeder line is provided with an anchor 11 which may be a small disk of concrete. The other end of the feeder line with the sand collecting bags attached is wrapped on a suitable drum 12.

The method for controlling sandbar erosion is as follows:

The anchor 11 is placed under a wave area 13 in which erosion is occurring and the feeder line 10 extends therefrom to the drum 12 mounted on the shore area 14. The wave action has the effect of applying slight tension to the feeder line causing the feeder line with its collecting bags 1 to be drawn into the surf. In the area subjected to wave action the sand 15 is undergoing movement. The depth at which the sand moves is dependent upon the strength of the wave action. Also some of the sand becomes suspended in the water. The wave action moves the sand collecting bags in random directions. As sand is received in the bags, the bags settle to the bottom of the wave area and continue to gather sand. Eventually the bags become fixed in the sand and the wave action continues to draw additional bags causing the bags and the feeder line to accumulate and form a tangled mass as represented in FIG. 3. This mass resists movement and causes the otherwise eroding sand to deposit between and around the bags.

Although the mouths of the bags are restricted to some extent adequate filling of the bags is attained and apparently the reduced opening helps to retain the sand. Retention is also aided by the divided chambers 6. While preliminary tests indicated some advantage, it should be noted that the conditions, to which the collecting bags and feeder lines may be subjected, vary substantially.

Having fully described my invention it is to be understood that I am not to be limited to the details herein set forth, but that my invention is of the full scope of the appended claims.

I claim:

1. A means for controlling a sandbar erosion comprising:
    a. a feeder line;
    b. means for anchoring one end thereof underneath a wave area, the line extending therefrom to an adjacent shore area;

c. means for movably securing the other end thereof to a structure on the adjacent shore;
d. a plurality of porous bags secured to said feeder line each having an open end for receiving sand;
e. the feeder line and bags being progressively movable by wave action into the wave area, the bags progressively receiving moving sand present in the wave area causing the bags to settle to the bottom of the wave area, and resist erosion.

2. A means for controlling sandbar erosion, as defined in claim 1, wherein:
a. each bag includes a plurality of parallel disposed sand receiving chambers.

3. A means for controlling sandbar erosion, as defined in claim 1, wherein:
a. each bag includes a pleated sand receiving opening;
b. the securing means is a string secured to the margins of the opening and tied at its extremities to the feeder line.

4. A means for controlling sandbar erosion, as defined in claim 1, which further comprises:
a. a reel disposed on the shore area arranged to receive the shore disposed portion of the feeder line and the bags attached thereto for progressive movement from the reel toward and into the wave area thereby increasing the accumulation of the bags which have received sand.

5. A method for controlling sandbar erosion utilizing a feeder line with a plurality of open ended porous bags secured in series along the feeder line, characterized by:
a. anchoring one end of the feeder line beneath a wave area wherein erosion is occurring;
b. movably securing the other end of the feeder line to a structure on the adjacent shore;
c. subjecting the portion of the feeder line and bags in the wave area to wave action whereby the feeder line and bags are progressively drawn from the shore area into the wave area;
d. and exposing the bags in the wave area to moving sand present in the water, for collection in the bags, whereby the sand filled bags and the portion of the feeder line secured to them will settle beneath the wave area in an overlapping relation, causing the formation of an erosion preventing groin-like deposit.

6. A method for controlling sandbar erosion, as defined in claim 5, characterized by:
a. continuing to permit the wave action to withdraw the feeder line and bags into the wave area to cause a tangled deposit of the feeder line and random deposit of bags serving to increase resistance to erosion.

* * * * *